US008543663B2

(12) United States Patent
Rehiman et al.

(10) Patent No.: US 8,543,663 B2
(45) Date of Patent: *Sep. 24, 2013

(54) GENERATION OF DATA CONCERNING RECEPTION OF MEDIA CONTENT AT A COMMUNICATION DEVICE (75) Inventors: Kalleri Faizel Rehiman, Fremont, CA (US); David Eyler, San Francisco, CA (US); Satish P. Nayak, Bangalore (IN); Ravinder Chouhan, Bangalore (IN); Gurubasappa Kore, Bangalore (IN)

(73) Assignee: Sling Media, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,375

(22) Filed: Sep. 14, 2012

(65) Prior Publication Data
US 2013/0013737 A1    Jan. 10, 2013

Related U.S. Application Data (63) Continuation of application No. 12/703,303, filed on Feb. 10, 2010, now Pat. No. 8,285,814.

(51) Int. Cl.
*G06F 15/16* (2006.01)
(52) U.S. Cl.
USPC ........... 709/217; 709/203; 709/207; 709/219; 709/231
(58) Field of Classification Search
USPC ........... 709/207, 217, 231, 203, 219; 725/25, 725/32, 38
See application file for complete search history.

(56) References Cited

U.S. PATENT DOCUMENTS

| | | | |
|---|---|---|---|
| 2,674,512 A | 4/1954 | Bogert et al. | |
| 2,855,993 A | 10/1958 | Rahmel et al. | |
| 3,093,795 A | 6/1963 | Jones et al. | |
| 3,172,948 A | 3/1965 | Rubinstein et al. | |
| 3,396,232 A | 8/1968 | Hendrickson et al. | |
| 3,514,530 A | 5/1970 | Simons et al. | |
| 3,586,771 A | 6/1971 | Hamburger et al. | |
| 3,676,580 A | 7/1972 | Beck et al. | |
| 3,733,430 A | 5/1973 | Thompson et al. | |
| 3,878,322 A | 4/1975 | Sullivan et al. | |
| 4,044,376 A | 8/1977 | Porter et al. | |
| 4,058,829 A | 11/1977 | Thompson et al. | |
| 4,107,734 A | 8/1978 | Percy et al. | |
| 4,216,497 A | 8/1980 | Ishman et al. | |
| 4,308,554 A | 12/1981 | Percy et al. | |

(Continued)

OTHER PUBLICATIONS

Strickland, Jonhatan, "How TiVo Works" HowStuffWorks, WebPage Printed Nov. 17, 2011.

(Continued)

*Primary Examiner* — Ramy M Osman
(74) *Attorney, Agent, or Firm* — Ingrassia Fisher & Lorenz, P.C.

(57) ABSTRACT

A method of providing data associated with reception of media content is presented. In the method, a communication device receives media content from a media content receiver via a communication network. The received media content is output to a user of the communication device. Data is then generated in the communication device which includes information identifying a channel selected by the user over which the media content receiver receives the media content. The data further includes information identifying a time period during which the communication device receives the media content. The data is transferred via the communication network to a communication node.

20 Claims, 6 Drawing Sheets

(56) References Cited

U.S. PATENT DOCUMENTS

| | | | |
|---|---|---|---|
| 4,388,644 | A | 6/1983 | Ishman et al. |
| 4,546,382 | A | 10/1985 | McKenna et al. |
| 4,566,030 | A | 1/1986 | Nickerson et al. |
| 4,567,511 | A | 1/1986 | Smith et al. |
| 4,658,290 | A | 4/1987 | McKenna et al. |
| 5,374,951 | A | 12/1994 | Welsh et al. |
| 5,382,970 | A | 1/1995 | Kiefl et al. |
| 5,497,185 | A | 3/1996 | Dufresne et al. |
| 5,848,396 | A | 12/1998 | Gerace et al. |
| 5,991,735 | A | 11/1999 | Gerace et al. |
| 6,160,989 | A | 12/2000 | Hendricks et al. |
| 6,457,010 | B1 | 9/2002 | Eldering et al. |
| 6,490,724 | B1 | 12/2002 | Ha et al. |
| 6,611,842 | B1 | 8/2003 | Brown et al. |
| 6,718,551 | B1 | 4/2004 | Swix et al. |
| 7,062,510 | B1 | 6/2006 | Eldering et al. |
| 7,523,156 | B2 * | 4/2009 | Giacalone, Jr. ............... 709/218 |
| 8,285,814 | B2 * | 10/2012 | Rehiman et al. ............. 709/231 |
| 2002/0032904 | A1 | 3/2002 | Lerner et al. |
| 2002/0129368 | A1 | 9/2002 | Schlack et al. |
| 2003/0037333 | A1 | 2/2003 | Ghashghai et al. |
| 2006/0242665 | A1 | 10/2006 | Knee et al. |
| 2007/0118590 | A1 * | 5/2007 | Giacalone, Jr. ............... 709/201 |
| 2007/0118848 | A1 | 5/2007 | Schwesinger et al. |
| 2008/0155591 | A1 * | 6/2008 | Mahajan et al. ................ 725/32 |
| 2008/0183839 | A1 * | 7/2008 | Shuqair et al. ................ 709/217 |
| 2009/0100473 | A1 | 4/2009 | Segel et al. |
| 2009/0158341 | A1 | 6/2009 | Miller et al. |
| 2009/0164600 | A1 * | 6/2009 | Issa et al. ...................... 709/219 |
| 2009/0193485 | A1 | 7/2009 | Rieger et al. |
| 2009/0240721 | A1 * | 9/2009 | Giacalone, Jr. ............... 707/101 |
| 2010/0071076 | A1 * | 3/2010 | Gangotri et al. ............. 709/231 |
| 2010/0146527 | A1 * | 6/2010 | Craib et al. ......................... 725/5 |
| 2011/0293278 | A1 * | 12/2011 | Mazed ............................ 398/67 |

OTHER PUBLICATIONS

TV2Me, "TV2M FAQ", Internet Archive Date May 19, 2006, http://www.tv2me.com/faqs.html.

TV2Me, "Watch TV Anywhere —TV2Me", Internet Archive Date May 12, 2008, http://www.tv2me.com/watch_TV_anywhere.html.

TV2Me, "TV2Me Placeshifts Your TV Anywhere", Internet Archive Date Oct. 1, 2006, http://www.tv2me.com/news_10012006.html.

* cited by examiner

GENERATION OF DATA CONCERNING RECEPTION OF MEDIA CONTENT AT A COMMUNICATION DEVICE

RELATED APPLICATIONS

This application claims the benefit of Indian Patent Application No. 3000/CHE/2009, entitled "GENERATION OF DATA CONCERNING RECEPTION OF MEDIA CONTENT AT A COMMUNICATION DEVICE", filed Dec. 4, 2009, which is hereby incorporated herein by reference in its entirety.

BACKGROUND

Several different methods have been proposed for tracking user habits of viewing audio/video programs. Some of these methods involve the installation of a separate communication device directly connected with a viewer's television set in the viewer's home to collect such information and to transfer that information periodically to a collection site. One example of such a system is the audience measurement system developed by Nielsen Media Research, in which a "Set Meter" and/or "People Meter" is attached to each television in a selected household. Information regarding the particular channel being watched is forwarded from each meter to a "Home Unit" located in the household, which collects the information and transfers it nightly over a telephone line to Nielsen. Other methods involving collection of data identifying television programs viewed in the home have also been proposed.

As technology for viewing television programming has evolved, previous methods of collecting viewing information have become less effective. For example, video place-shifting devices, including the Slingbox® by Sling Media Inc., allow users to access a video content source, such as a satellite or cable television set-top box, standalone digital video recorder (DVR), or digital video disc (DVD) player, from a remote location. For example, a user on a business trip far from home may use a desktop or laptop computer, cellular phone, personal digital assistant (PDA), or other communication device to communicate by way of the Internet, cellular network, or other communication network with a place-shifting device attached to a television set-top box located in the user's home. Through this communication, the user may control the set-top box to perform a variety of functions, including setting recording timers for an internal DVR, viewing audio/video programming being received live at the set-top box, and viewing programs previously recorded on the set-top box DVR. To view this programming, the set-top box transfers the programming over the same communication network to the communication device, which presents the programming to the user by way of an output display, such as a computer screen. Viewing television programming remotely in such a manner without the use of a home-located television may thus complicate information retrieval regarding a user's viewing habits.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
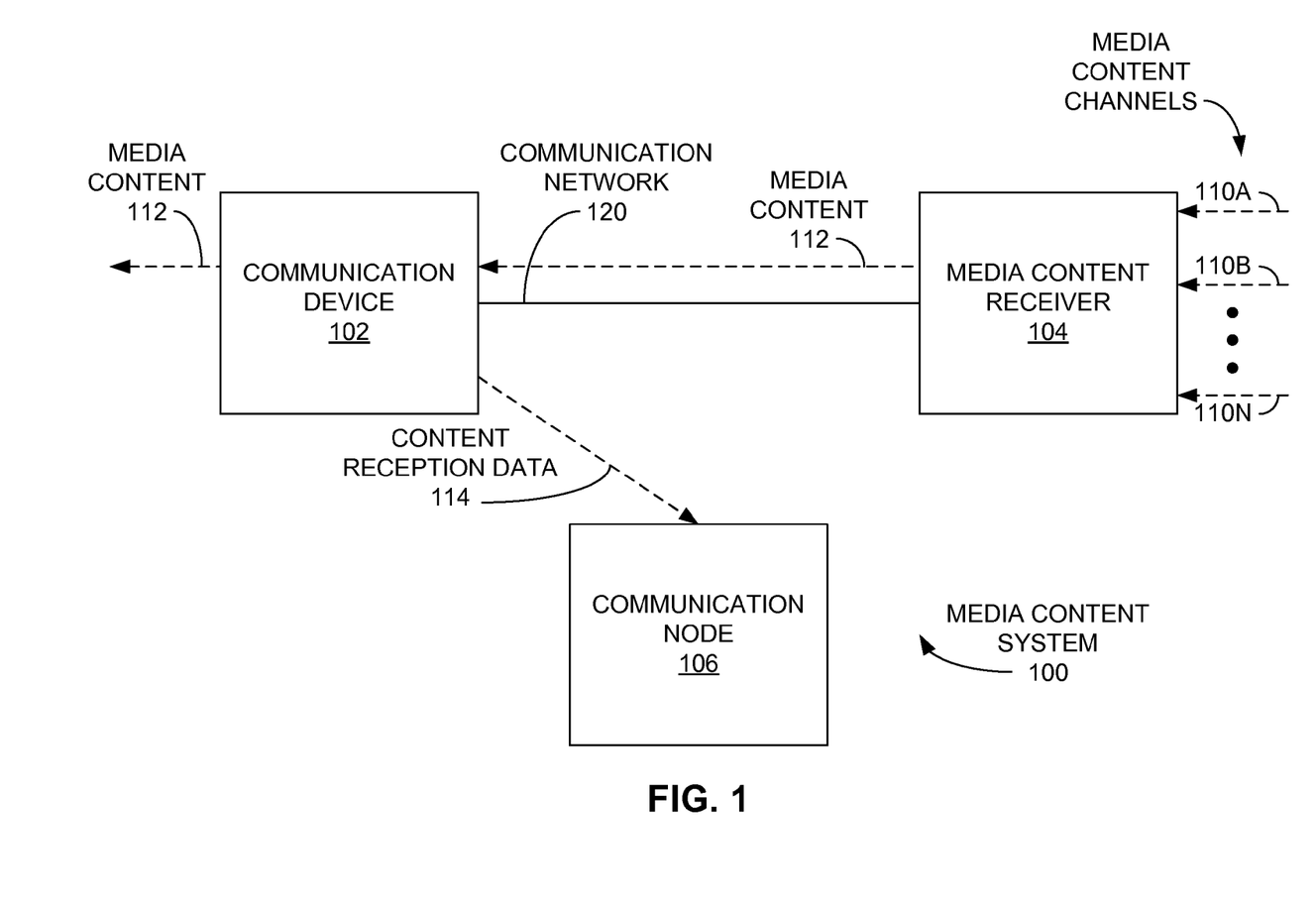
FIG. 1 is a block diagram of a media content system according to an embodiment of the invention.

FIG. 1 provides a block diagram of a media content system 100 according to an embodiment of the invention. The system 100 includes a communication device 102, a media content receiver 104, and a communication node 106. At least the communication device 102 and the media content receiver 104 are coupled with each other by way of a communication network 120. In one implementation, the communication network 108 is a wide-area network (WAN), such as the Internet, thus allowing the communication device 102 and the media content receiver 104 to be spaced apart by a significant geographical distance. In one embodiment, the communication device 102 is communicatively coupled with the communication node 106 over the same communication network 120.

As shown in FIG. 1, the media content receiver 104 may receive any of a number of media content channels 110A, 110B, . . . , 110N. A user of the communication device 102 may select any of these media content channels 110 as the source of media content 112 to be transmitted over the communication network 120 to the communication device 102. The media content 112 may be any of textual content, audio content, visual or video content, or any other type of content that may be consumed by a user. One example of the media content receiver 104 may be an audio/video content receiver, such as a television set-top box, but other types of receivers capable of receiving multiple channels 110 of media content, whether by broadcast, multicast, closed-circuit, or other communication means, may be employed to similar effect.

The communication device 102 may be any type of communication device 102 configured to receive the media content 112 from the media content receiver 104 and present or output the content 112 to the user. Examples of the communication device 102 may include laptop or desktop computers, personal digital assistants (PDAs), cellular phones, and other types of communication equipment.

The communication node 106 is configured to receive data 114 from the communication device 102, wherein the data 114 is associated with the reception of the media content 112. The communicate node 106 may be any device or system configured to receive such data, such as a communication network server, general purpose computer, or other processing device.

Figure 2:
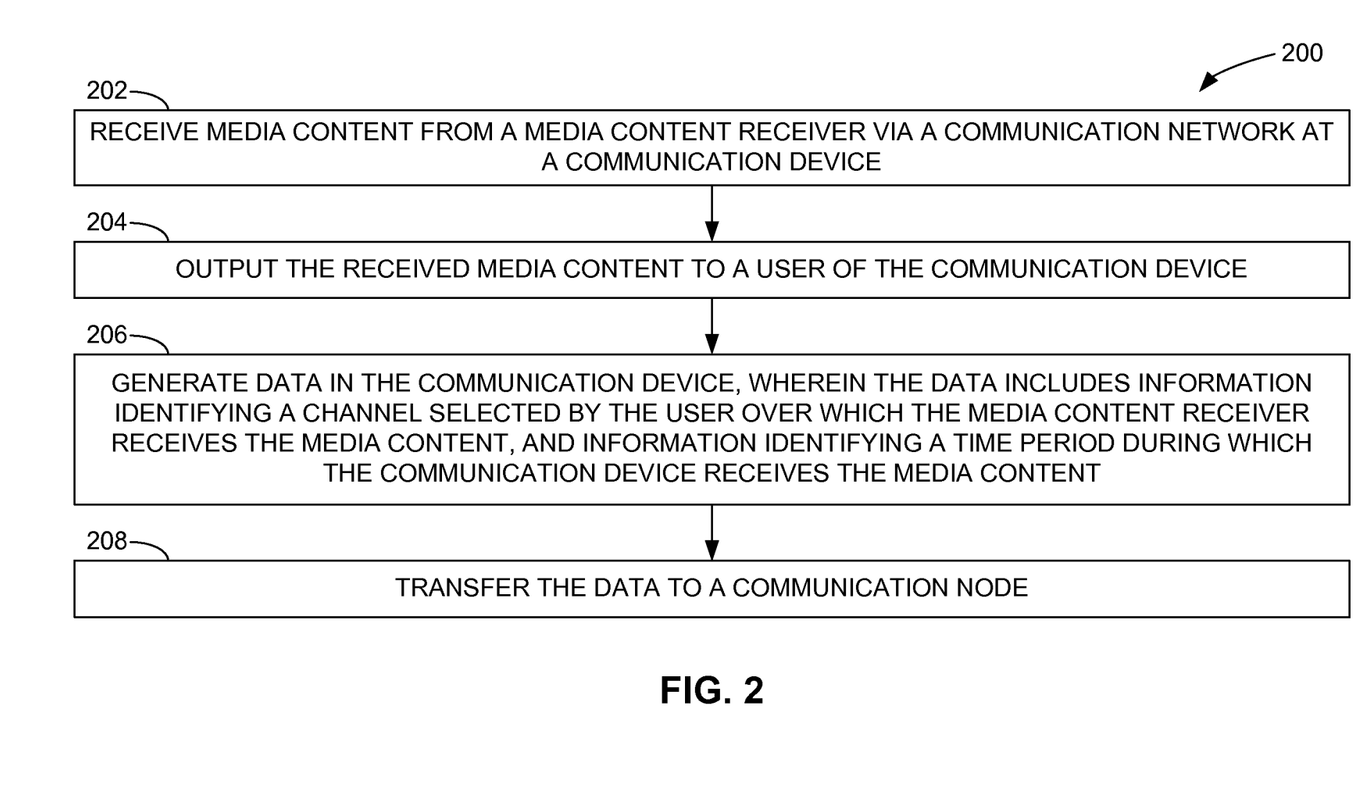
FIG. 2 is a flow diagram of a method according to an embodiment of the invention for providing data associated with reception of media content.

FIG. 2 is a flow diagram of a method 200 for providing data associated with media content reception. In the following discussion, the media content system 100 of FIG. 1 is utilized as the environment for the method 200, although other systems may be employed in other embodiments. In the method 200, the communication device 102 receives media content 112 by way of the communication network 120 from the media content receiver 104 (operation 202). The received media content 112 is output to a user of the communication device 102 (operation 204). The communication device 102 generates the data 114 including information identifying a channel 110 selected by the user over which the media content receiver 104 receives the media content 112, as well as information identifying a time period during which the communication device 102 receives the media content 112 (operation 206). The data 114 is then transferred to the communication node 106 (operation 208). In another embodiment, a computer-readable storage medium may have encoded thereon instructions for at least one processor or other control circuitry of the communication device 102 of FIG. 1 to implement the method 200.

As a result of at least some embodiments of the method 200, the communication device 102 may generate data 114 related to the reception of media content 112 from a remote location over the network 120. Such information 114 may be employed to identify the programs being viewed by a user via the communication device 102, thus giving one or more entities, such as content providers, advertisers, and the like, more insight into the level of popularity of specific programs among viewers that access programming remotely. Other advantages may be recognized from the various implementations of the invention discussed in greater detail below.

Figure 3:
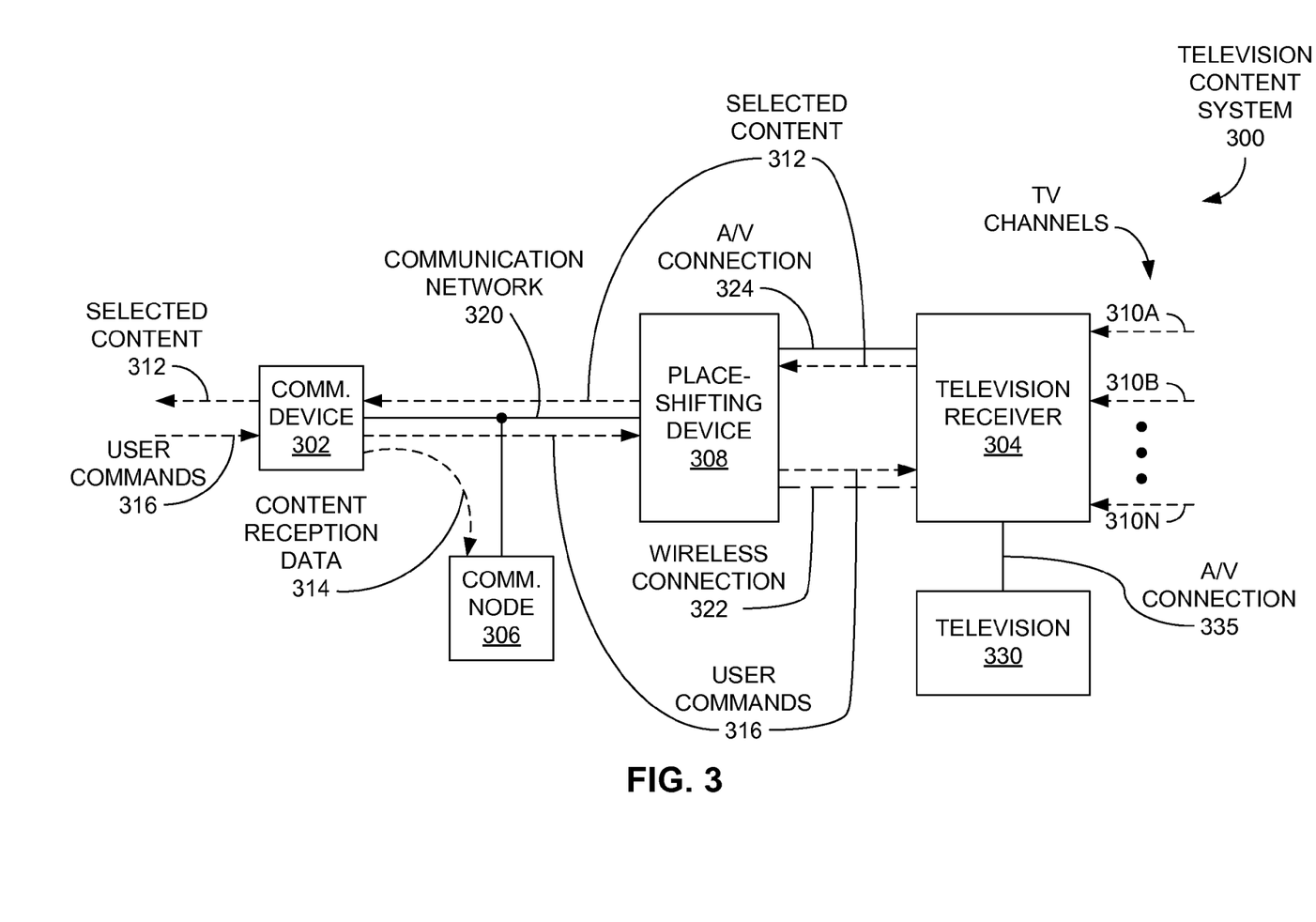
FIG. 3 is a block diagram of a television content system according to an embodiment of the invention.

FIG. 3 is a block diagram of television content system 300, which represents a more detailed example of the communication system 100 of FIG. 1. The television content system 300 includes a communication device 302, a television receiver 304, a communication node 306, and a place-shifting device 308.

Typically, the television receiver 304 provides one of a number of television channels 310A, 310B, . . . , 310N, as selected by a user of a closely-located television 330, to the television 330 over an audio/video connection 335 for viewing. Examples of the television receiver 304 may include, but are not limited to, a satellite, cable, or terrestrial ("over-the-air") set-top box, and a standalone DVR unit. As a result, the television receiver 304 may provide television programming from at least one audio/video source, such as a satellite in geosynchronous orbit, a coaxial cable head-end, or a terrestrial antenna.

Figure 4:
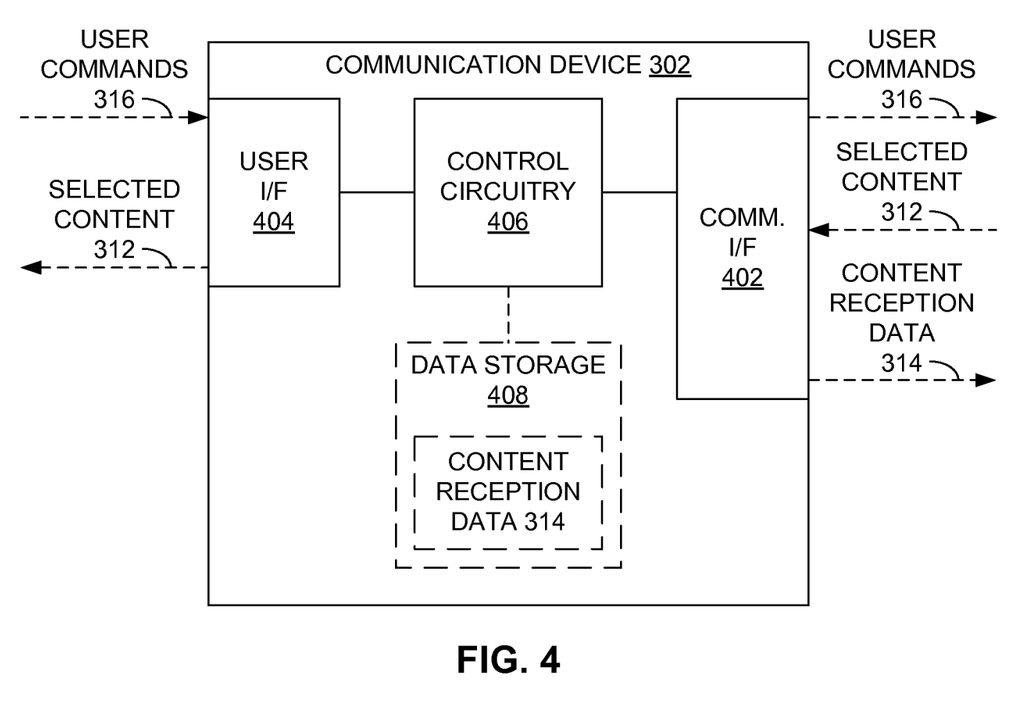
FIG. 4 is a block diagram of a communication device of the television content system of FIG. 3 according to an embodiment of the invention.

The place-shifting device 308 of FIG. 4 facilitates communication between the television receiver 304 and the communication device 302. More specifically, the place-shifting device 302 may receive user commands 316 from the communication device 302 via the communication network 320 to perform various operations, including selecting one of the television channels 310 for viewing selected media content 312. Further, the place-shifting device 308 may be coupled with the television receiver 304 by way of another audio/video connection 324 so that selected media content 312 received by way of the receiver 304 may be forwarded to the communication device 302 over the communication network 320. In another example, the place-shifting device 308 may provide an audio/video output (not shown in FIG. 3) to pass audio/video programming received from the television receiver 304 to the television 330. Such an arrangement may be advantageous if the receiver 304 only provides a single audio/video output connection 324.

In other arrangements, the place-shifting device 308 may incorporate the functionality of the television receiver 304, or vice-versa, thus allowing a single device to receive the multiple channels 310 of television programming, select one of the channels 310 under the direction of the user of the communication device 302, and transfer the content 312 of the selected channel 310 over the communication network 320 to the communication device 302.

To allow the user of the communication device 302 to control the television receiver 304, the place-shifting device 308, such as one of several models of Slingbox® provided by Sling Media Inc., may also produce infrared remote control signals over a wireless connection 322 so that the place-shifting device 308 may transmit the user commands 316 received over the communication network 320 to the receiver 304 by way of an infrared remote control device input of the receiver 304. Generally, these commands are the same as those transmitted by a remote control device that is normally supplied to the user with the receiver 304. Thus, the place-shifting device 308 operates as a sort of remote control emulator under the control of the communication device 302. In other examples, other forms of remote control signals, such as radio frequency (RF) signals or acoustic signals, may be employed in other implementations.

In FIG. 3, the communication device 302 may be any device capable of communicating with the place-shifting device 308 over the communication network 320, including, but not limited to, desktop or laptop computers, cellular phones, and PDAs. The communication device 302 originates the user commands 316 intended for the television receiver 304 by transmitting such commands 316 over the communication network 320 to the place-shifting device 308, which may then transform the commands 316 from a format compatible with the network 320 for use over the wireless connection 322. In one example, the communication network 320 may be a wide-area network (WAN), such as the Internet. In that case, the commands transmitted by the communication device 302 to the place-shifting device 308 may be formatted as digital data in one or more data packets conforming to the Transmission Control Protocol/Internet Protocol (TCP/IP), although other communication protocols may be employed to similar end in other embodiments. The place-shifting device 308 then converts that data into a form acceptable to the receiver 304 as the user commands 316. Similarly, the selected television content 312 may be transferred or streamed over the communication network 320 by way of these same or related communication protocols.

FIG. 4 is a block diagram of the communication device 302 of FIG. 3 according to an embodiment of the invention. The device 302 includes a communication interface 402, a user interface 404, and control circuitry 406. Additionally, the communication device 302 may include data storage 308, as is described in greater detail below. Other components, such as a power supply, may also be included in the communication device 302, but such components are not explicitly shown in FIG. 4 nor discussed below to simplify the following discussion.

The communication interface 402 of the communication device 302 is configured to communicate with the communication node 306 and the place-shifting device 308 of FIG. 3. The communication interface 402 may be a WAN interface, such as an interface to communicate via the Internet, although other interfaces, such as a LAN interface or a wireless network adapter, may be employed in other arrangements. Specific examples of the communication interface 402 include, but are not limited to, a cable or digital subscriber line (DSL) interface, a Wi-Fi interface, and a cellular communication network interface.

The user interface 404 of the communication device 302 is configured to receive commands from a user of the communication device 302 for controlling the television receiver 304 of FIG. 3. The user interface 404 may include any number of input and/or output components to allow the user to interact with the communication device 302, such as a keyboard, keypad, mouse, joystick, touchpad, visual monitor, video display, and/or audio speakers. In some cases, the user interface 404 may incorporate its own remote control interface so that the user need not be positioned within reach of the communication device 302 to provide input thereto.

If included in the communication device 302, the data storage 408 of FIG. 4 may be configured to store the content reception data 314 noted in FIG. 3, as well as other information necessary for operation of the communication device 302. In some instances, the data storage 408 may store the incoming selected content 312 for ultimate presentation to the user, as well as any software and related data required by the control circuitry 406 to perform its various tasks, as discussed in greater detail below. The data storage 408 may be any data storage capable of storing digital data, including volatile data storage, such as dynamic random-access memory (DRAM) or static random-access memory (SRAM), nonvolatile data storage, such as flash memory, magnetic disk drives, and optical disk drives, or combinations thereof.

The control circuitry 406 is configured to control and interact with the user interface 404 and the communication interface 402. The control circuitry 406 may include one or more processors, such as microprocessors, microcontrollers, or digital signal processors (DSPs), configured to execute instructions to operate the communication device 402. In other embodiments, the control circuitry 406 may include strictly hardware components, or include a combination of hardware and software elements.

Generally, the control circuitry 406 is configured to receive the user commands 316 intended for the television receiver 304 from the user of the communication device 302 via the user interface 404, process those commands 316 into a format understandable by the receiver 304, and transfer the commands 316 over the communication network 320 to the place-shifting device 308, which forwards the user commands 316 to the television receiver 304 over the wireless connection 322. Among these commands are those selecting one of the programming channels 310 for viewing, as described above.

In response to the commands 316, the television receiver 304 transmits the media content 312 of the selected channel 312 over the audio/video connection 324 to the place-shifting device 308, which in turn forwards the selected content 312 via the communication network 320 to the communication device 302. Subsequently, the control circuitry 404 of the communication device 302 employs the user interface 404, by way of a visual display, audio speakers, and/or the like, to present the content 312 to the user.

In one embodiment, the control circuitry 406 performs the operations discussed above through execution of a device software application developed specifically for such purposes. For example, the user may employ the user interface 404 to initiate the application, through which the user may enter the user commands 316, and subsequently receive the selected content 316.

As a result of the communication device 302 receiving and presenting the selected content 312, the control circuitry 406 of the device 302 generates data 314 related to the transfer and presentation of the content 312. Non-exhaustive examples of the content reception data 314 are listed in FIG. 5. In one embodiment, the communication device 302 generates or otherwise provides a user identifier 502 associated with the user of the device 302. This generation of the user identifier 502 may occur, for example, when the user first opens an application on the communication device 302 to issue the user commands 316 and receive the resulting content 312. In this case, the same user identifier 502 may be employed over many different data sessions, or multiple initiations of the application. In another example, a separate system, such as the communication node 306, generates the user identifier 502 in response to a request from the communication device 302, which may be prompted by the user executing the device application discussed above for the first time. The node 306 may then transfer the user identifier 502 to the communication device 302. Upon reception of the identifier 502 via the communication interface 602, the control circuitry 406.may then store the user identifier 502 in the data storage 408. Thereafter, the current and subsequent executions of the application may cause the communication device 302 to associate the identifier 502 with the selected content 312 requested and received via the application. In one implementation, the user identifier 502 is a randomly-generated set of alphanumeric characters, thus helping prevent subsequent association of the identifier 502 with the name or other identifying information of the user.

Figure 5:
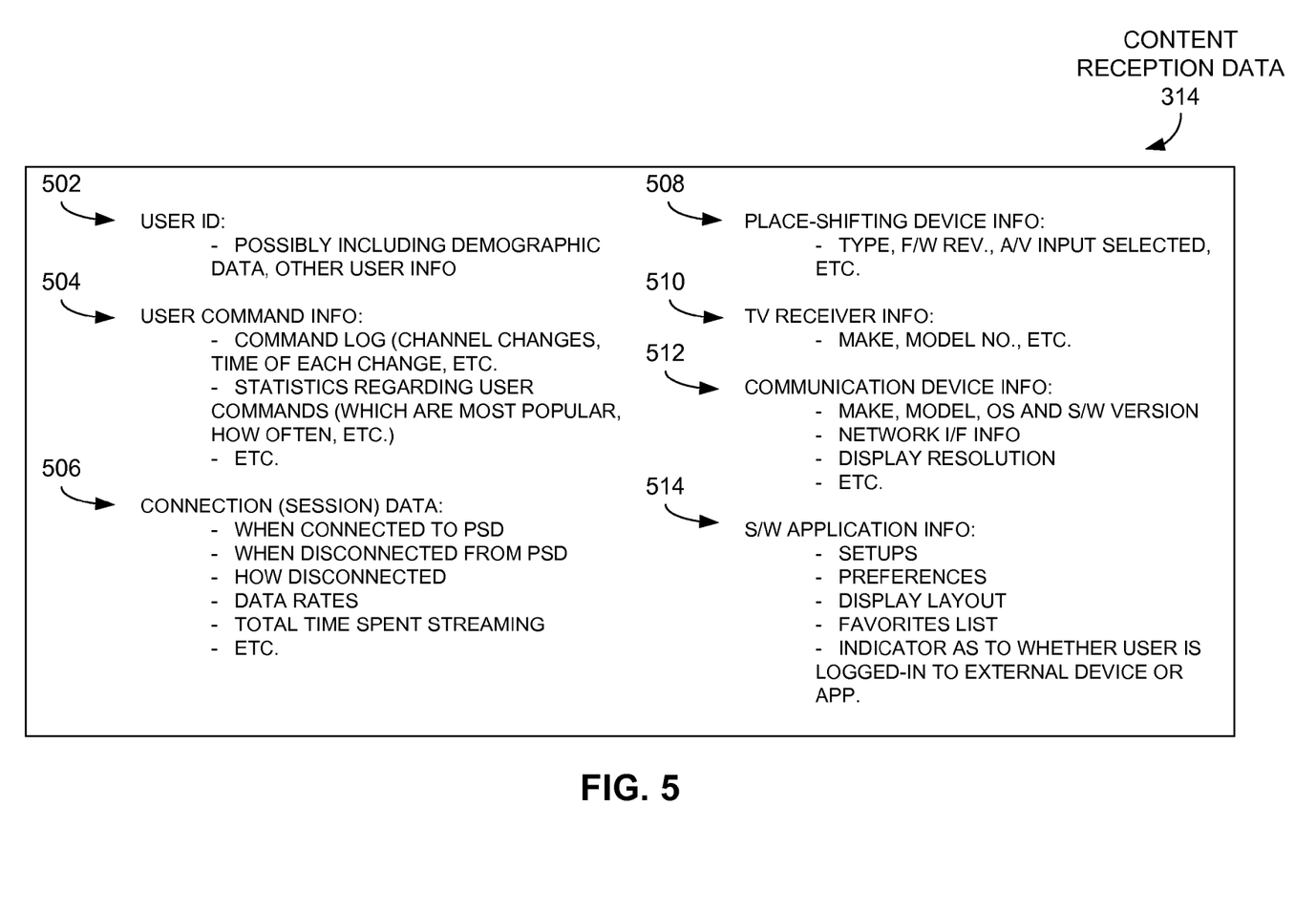
FIG. 5 is a listing of examples of possible content reception data generated and transmitted by the communication device of FIG. 4 according to an embodiment of the invention.

Other information describing the user in general terms may be associated with the user identifier 502. For example, demographic information, such as the age, gender, general area of residence, income level, general interests, and other information regarding the user, may be included or coupled with the identifier 502. In one example, the user may input such information upon using the device application for the first time, although other ways of allowing the user to supply this information, such as by way of a questionnaire available through the communication device 302 on an Internet web site, may also be employed. Further, as with the user identifier 502, the demographic information may be stored on the communication device 302, on the communication node 306, or on another electronic device.

Also included in the content reception data 314 may be user command information 504, which may include the types of commands 316 issued to the television receiver 304, and the times at which those commands 316, such as channel change commands, were issued by way of the communication device 302. As described more fully below, such information may be processed to determine which specific television programs the user was viewing. The control circuitry 406 may also generate statistics based on the user command information 504, such as how often a particular command was issued, which commands were the most popular, and so on. Such commands need not include just channel-changing commands, but may involve electronic program guide (EPG) requests and navigation, DVR timer commands, navigation (e.g., fast-forward, rewind, pause, and so on) of recorded programs, and others. Therefore, the user command information 504 may not only help determine the viewing habits of the user, but may also exhibit how the user operates the receiver 304, thus providing insight into how the command set of the receiver 304 may be improved.

Further included in the content reception data 314 may be information 506 associated with or describing a logical connection or data session between the communication device 302 and the place-shifting device 308. In one example, the control circuitry 406 (possibly by way of the device application noted above) may cause such a connection or session, such as a Transmission Control Protocol (TCP) connection, to be created between the two devices 302, 308 so that the user commands 316 may be transferred to the place-shifting device 308, and the selected media content 312 may be returned to the communication device 302. Such connection-associated information 506 may include a time stamp as to when the connection was initiated, when the connection was terminated, and how the connection was terminated (e.g., by the user explicitly closing the connection, by the user terminating the application, or by the application terminating unexpectedly). Other aspects of the connection, such as instantaneous and average data rates of the transfer of the selected content 312 to the communication device 302, or the total amount of time consumed with streaming of the selected content 312, may also be included in the connection information 506.

The connection information 506 may be utilized to determine user patterns in how the user utilizes the application and the communication device 302 to view programming, such as the particular times of day or days of the week involved. The information 506 may also aid in determining the operating performance level of the communication device 302 and application under various circumstances.

In some implementations, the content reception data 314 may further include information concerning various aspects of the devices involved in delivering the selected content 312 to the user. As shown in FIG. 5, this information may include place-shifting device information 508, television receiver information 510, and communication device information 512. For example, the place-shifting device information 508 may include the type, manufacturer, and/or model of the place-shifting device 308, as well as the revision number of the firmware being executed by the place-shifting device 308. The communication device 302 may receive such information from the place-shifting device 308 during ongoing or previous communications between the devices 302, 308 over the communication network 320. In another example, the place-shifting device information 508 may include information regarding an operational state of the place-shifting device 308, such as the identity of the particular audio/video input of the place-shifting device, including the audio/video connection 324 depicted in FIG. 3. Other information regarding other aspects of the place-shifting device 308 not specifically described herein may be included in the place-shifting device information 508.

Similarly, the television receiver information 510 may include the manufacturer of the receiver 304, the model number of the receiver 304, a revision number for the firmware being executed in the receiver 304, and other information identifying or otherwise descriptive of the television receiver 304 or its components.

The communication device information 512 may incorporate information similar to that described above, such as the manufacturer, model, and software or firmware revision number associated with the communication device 302. Also included in the communication device information 512 may be operational settings or characteristics of the communication device 302, such as the type of interface being employed to communicate with the place-shifting device 308 via the communication network 320. For example, if the network 320 is the Internet, the type of communication interface employed may be a cable or DSL (Digital Subscriber Line) connection, a Wi-Fi connection, an EDGE (Enhanced Data rates for GSM Evolution) connection, or an EVDO (Evolution Data-Optimized) connection. Further, the information 512 may include an indication as to whether the device 302 was coupled to a home network, or if the device was in "roaming" mode. Other information 512 may include a mobile network code (MNC) and/or a mobile country code (MCC) associated with the carrier utilized by the communication device 302 to connect the device 302 with the communication network 320. Also included in the information 512 may be data describing an operational state of the device 302, such as the video resolution of the display of the device 302 being used to present the selected content 312 to the user. Other information not specifically enumerated herein concerning the communication device 302 may be included in the communication device information 512.

Another type of information possibly included in the content reception data 314 may be information 514 describing aspects of a software application executing on the communication device 302 to facilitate the issuing of the user commands 316 and the reception and presentation of the selected content 312. Such information 514 may include, but is not limited to, user preferences, user favorite program or channel lists, display layouts, presentation aspect ratios (e.g., 16:9, 4:3, etc.) and the like.

In one implementation, the application information 514 may include an indication as to whether the user is or was logged into an online server or communication node via the communication network 120. Such a node may provide, for example, viewing guide information (such as that found in an electronic program guide (EPG)), user-specific information, and so on.

Aside the various types of information 502-514 described above, other information concerning or related to the communication device 302, the television receiver 304, the place-shifting device 308, software or firmware executing thereon, the user, the selected content 312, and the commands 316 issued by the user, may be incorporated in the content reception data 314 in other embodiments.

In one example, the content reception data 314 generated and/or collected in the communication device 302 may be data session or connection specific, and thus generated on a session-by-session basis. As a result, in one implementation, the communication device may then transfer the data 314 associated with a particular session to the communication node 306 at any point after a particular communication session between the communication device 302 and the place-shifting device 308 has ended. For example, the communication device 302 may transmit the content reception data 314 immediately after completion of the related session. In another implementation, the device 302 may transmit the data 314 once the user closes the device 302 application responsible for receiving the selected content 312. In another embodiment, the communication device 302 instead may transfer the data 314 once the application is reopened, or while no other applications are open on the communication device 302.

Figure 6:
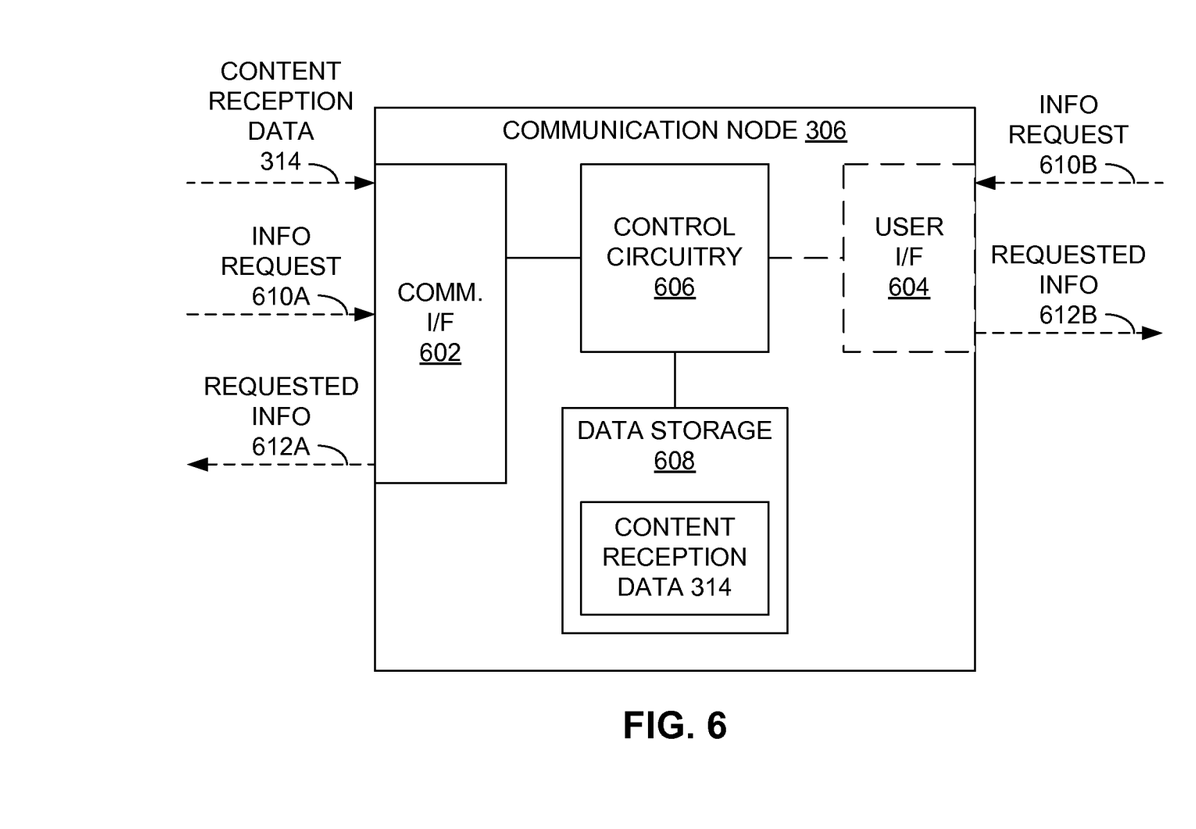
FIG. 6 is a block diagram of a communication mode of the television content system of FIG. 3 according to an embodiment of the invention.

An example of the communication node 306 receiving the content reception data 314 is illustrated in the block diagram of FIG. 6. In that example, the communication node 306 includes a communication interface 602, control circuitry 606, and data storage 608. Additionally, the node 306 may include a user interface 604. Other components, including, but not limited to, a power supply, may also be included in the communication node 306, but such components are not explicitly shown in FIG. 6 nor discussed further below to simplify the following discussion.

The communication interface 602 is configured to receive the content reception data 314 via the communication network 320. Further, as is described more fully below, the communication interface 602 may receive information requests 610A, and transmit corresponding information 612A in response to the requests 610A. As with the communication device 302, the communication interface 602 of the node 306 may be a WAN interface, such as an interface to communicate via the Internet, although other interfaces, such as a LAN interface or a wireless network adapter, may be employed in other arrangements. Specific examples of the communication interface 402 include, but are not limited to, a cable or DSL interface, a Wi-Fi interface, and a cellular communication network interface.

The data storage 608 is configured to store the content reception data 314 and information derived therefrom. The data storage 608 may be any data storage capable of storing digital data, including volatile data storage, such as dynamic random-access memory (DRAM) or static random-access memory (SRAM), nonvolatile data storage, such as flash memory, magnetic disk drives, and optical disk drives, or combinations thereof.

If included, the user interface 604 of the communication node 306 may be configured to receive information requests 610B from an operator of the node 306, as well as to provide corresponding information 612B in response to the requests 610B. As with the communication device 302, the user interface 304 of the node 306 may include any number of input and/or output components to allow the user to interact with the communication node 306, such as a keyboard, keypad, mouse, joystick, touchpad, visual monitor, video display, and/or audio speakers.

The control circuitry 606 of the node 306 is communicatively coupled with the communication interface 602, the data storage 608, and the user interface 604 (if present) to perform the functions more particularly described hereinafter. In one example, the control circuitry 606 may include one or more processors, such as microprocessors, microcontrollers, or DSPs, configured to execute instructions designed to control the various components of the node 306. These instructions may be stored in the data storage 608 or another data storage or memory unit not specifically depicted in FIG. 6. In another implementation, the control circuitry 606 may be composed of hardware circuitry not requiring software instructions, or of some combination of hardware and software elements.

Generally, the control circuitry 606 is configured to receive the content reception data 314 from the communication device 302. In one implementation, the control circuitry receives data 314 from each of multiple communication devices 302 associated with different users. The control circuitry 606 may then process the data 314 received from the one or more communication devices 302 prior to, or in response to, the information requests 610.

In one implementation, the requests 610 may be for information 612 related to a particular user, such as the viewing habits of the user. To this end, the control circuitry 606 may process the user command information 504 mentioned above to identify the selected content 312 received at the communication device 302. In one example, the control circuitry 606 may determine which channel 310 was being viewed at a particular time. Comparing this channel and time information with program scheduling information, such as that provided by in an electronic program guide (EPG), will then allow the control circuitry 606 to identify the selected program, such as by way of the program title. In one implementation, the control circuitry 606 selects the EPG appropriate for the channels 510 being received at the television receiver 304 from multiple EPGs corresponding to multiple geographic regions. The multiple EPGs may be stored in the data storage 608 of the communication node 306 or received at the node 306 from another source. The control circuitry 606 may determine the correct EPG by way of other information contained in the content reception data 414, such as information associated with the user identifier 502 discussed above.

Such viewing information 612 may then be used to generate specific viewing recommendations for the user of the communication device 302. These recommendations may include, for example, an identification of one or more programs, the particular time and channel at which the programs may be viewed, and information describing the programs. In one arrangement, these recommendations may be generated by the requester of the viewing habit information 612. In another example, the recommendations may be generated automatically within the communication node 306 without the need for explicit information requests 610. In either case, the resulting recommendations may be transferred to the communication device 302 over the communication network 320 for presentation to the user of the device 302.

Other information 612 related to a particular user may include advertising for products or services in which the user might be interested. This particular class of information 612 may be generated based on the type of content 312 selected by the user. For example, a user that selects programs that involve auto-racing may be shown advertising related in one way or another to automobiles. As with the viewing recommendations discussed above, this advertising, or the identification thereof, may be generated by the communication node 306 without prompting, or in response to a request for the information 612. The resulting advertising may then be delivered by either of these entities or a third-party to the communication device 302, which may then present the advertising to the user of the device 302.

In another implementation, the information 612 requested may be related to multiple users associated with a plurality of communication devices 302. In this example, the communication node 306 may serve as a repository for content reception data 314 from hundreds or thousands of communication devices 302. The node 306 may further process the information to create a database of viewing habits for various identifiable demographic groups. Such information may include the identification of programs that are popular with particular groups, and how those programs are viewed (e.g., all at once, in small sections, etc.) Further, this information may be utilized to determine the number of viewers receiving a particular channel at a specific time of day or week, which may serve as the basis for program ratings. Moreover, determinations may be made concerning which viewers maintain similar viewing habits based on the information 612. Other types of data related to viewing habits and demographics may also be made from this information 612. As with the other types of information 612 described above, information regarding multiple users may be requested by way of the user interface 604 of the communication node 306, or via the communication network 320 from another device coupled thereto.

Another example of multiple-user information may be information comparing the performance exhibited by different types of communication devices 302, place-shifting devices 308, and television receivers 304 in delivering the selected content 312 to the communication devices 302. Further, the information may be used to discern the performance characteristics of the communication network 320, telephone access networks, and the like involved in the transfer of the selected content 312. In another implementation, the performance information may include fault or defect information from either one or multiple communication devices 302 to allow a requestor of the information to identify and alleviate problems with any of the devices 302, 304, 308 engaged in transferring the content 312, as well as the network 320 or associated carrier services involved.

In summary, at least some embodiments as described herein provide a system and method by which data related to reception of media content by a communication device over a communication network is generated. This information may be delivered to a communication node, which may then service requests for information based on that data. Such information may be employed to generate viewing recommendations, advertising, and the like based on the remote viewer's programming preferences indicated in the information. Moreover, collection of such data from multiple users allows generation of information regarding viewing habits of remote viewers for various demographic groups, as well as content transmission performance or defect information.

While several embodiments of the invention have been discussed herein, other implementations encompassed by the scope of the invention are possible. For example, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A cellular phone, comprising:
a communication interface configured to receive data from a wireless network;
a processor communicatively coupled to the communication interface;
a display communicatively coupled to the processor; and
a user interface communicatively coupled to the processor, wherein the processor is configured to:
receive media content from a place-shifting device via the communication interface;
display the media content on the display;
generate data based on the received media content, wherein the data comprises information identifying the media content displayed on the display, and wherein the data comprises information identifying a time period during which the cellular phone device receives the media content; and
transferring the generated data to a communication node.

2. The cellular phone of claim 1, wherein the communication interface is a cellular communication network.

3. The cellular phone of claim 1, wherein the communication interface is a Wi-Fi interface.

4. The cellular phone of claim 1, wherein the media content is a live broadcast.

5. The cellular phone of claim 4, wherein the generated data further comprises a television channel of the live broadcast.

6. The cellular phone of claim 1, wherein the media content is a pre-recorded media content.

7. The cellular phone of claim 1, wherein processor is further configured to:
receive a request for specific media content from the user interface; and
transmit the request to the place-shifting device via the communication interface.

8. A communication device, comprising:
a communication interface configured to receive data from a wireless network;
a processor communicatively coupled to the communication interface;
a display communicatively coupled to the processor; and
a user interface communicatively coupled to the processor, wherein the processor is configured to:
receive media content from a place-shifting device via the communication interface;
display the media content on the display;
generate data based on the received media content, wherein the data comprises information identifying the media content displayed on the display, and wherein the data comprises information identifying a time period during which the communication device receives the media content; and
transferring the generated data to a communication node.

9. The communication device of claim 8, wherein the communication device is a cellular phone and the communication interface is a cellular communication network.

10. The communication device of claim 8, wherein the communication interface is a Wi-Fi interface.

11. The communication device of claim 8, wherein the media content is a live broadcast.

12. The communication device of claim 11, wherein the generated data further comprises a television channel of the live broadcast.

13. The communication device of claim 8, wherein the media content is a pre-recorded media content.

14. The communication device of claim 8, wherein processor is further configured to:
receive a request for specific media content from the user interface; and
transmit the request to the place-shifting device via the communication interface.

15. The communication device of claim 8, wherein the communication device is a laptop computer.

16. A method of providing data associated with reception of media content, the method comprising:
receiving media content from a place-shifting device via a communication network at a communication device;
outputting the received media content to a display of the communication device;
generating media consumption data, the media consumption data tracking the media outputted to the display; and
transferring the media consumption data to a communication node.

17. The method of claim 16, wherein the media consumption data further comprises information describing a logical connection between the communication device and the place-shifting device wherein the communication device receives the media content via the communication network during the existence of the logical connection.

18. The method of claim 16, wherein the media consumption data further comprises information describing the communication device.

19. The method of claim 16, wherein the media consumption data further comprises information describing a user of the communication device.

20. The method of claim 16, wherein the media consumption data further comprises information describing interaction between a user of the communication device and the communication device.

* * * * *